March 9, 1948.  E. W. RICH  2,437,653
VALVE-IN-HEAD ROTARY INTERNAL COMBUSTION ENGINE EMBODYING
A ROTARY PISTON WITH RADIAL SLIDING VANES AND
HAVING A COMBUSTION CHAMBER IN THE HEAD
Filed July 3, 1943  5 Sheets-Sheet 1

Inventor

Everett W. Rich

By Clarence A. O'Brien
and Harvey B. Jacobson
Attorneys

March 9, 1948.  E. W. RICH  2,437,653
VALVE-IN-HEAD ROTARY INTERNAL COMBUSTION ENGINE EMBODYING
A ROTARY PISTON WITH RADIAL SLIDING VANES AND
HAVING A COMBUSTION CHAMBER IN THE HEAD
Filed July 3, 1943  5 Sheets-Sheet 2

Inventor

Everett W. Rich

By Clarence A. O'Brien
and Harvey B. Jacobson
Attorneys

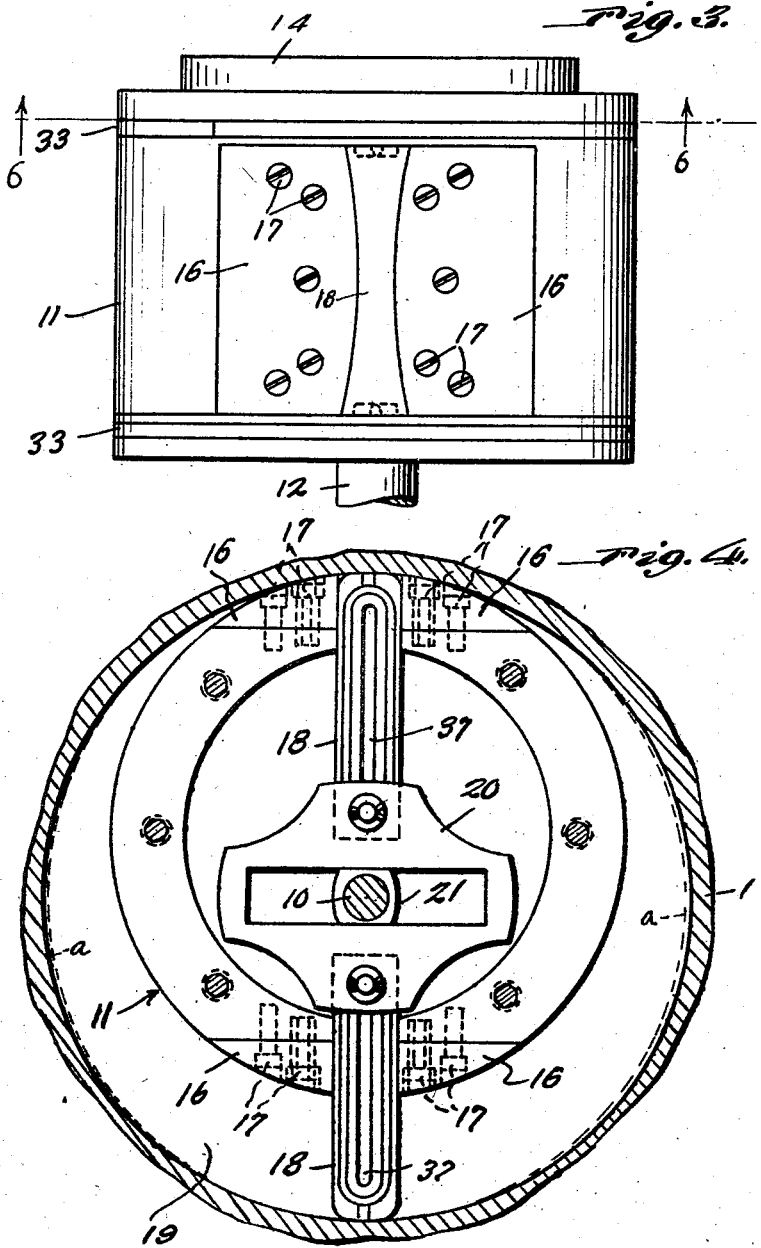

March 9, 1948.                    E. W. RICH                    2,437,653
VALVE-IN-HEAD ROTARY INTERNAL COMBUSTION ENGINE EMBODYING
A ROTARY PISTON WITH RADIAL SLIDING VANES AND
HAVING A COMBUSTION CHAMBER IN THE HEAD
Filed July 3, 1943                                5 Sheets-Sheet 4
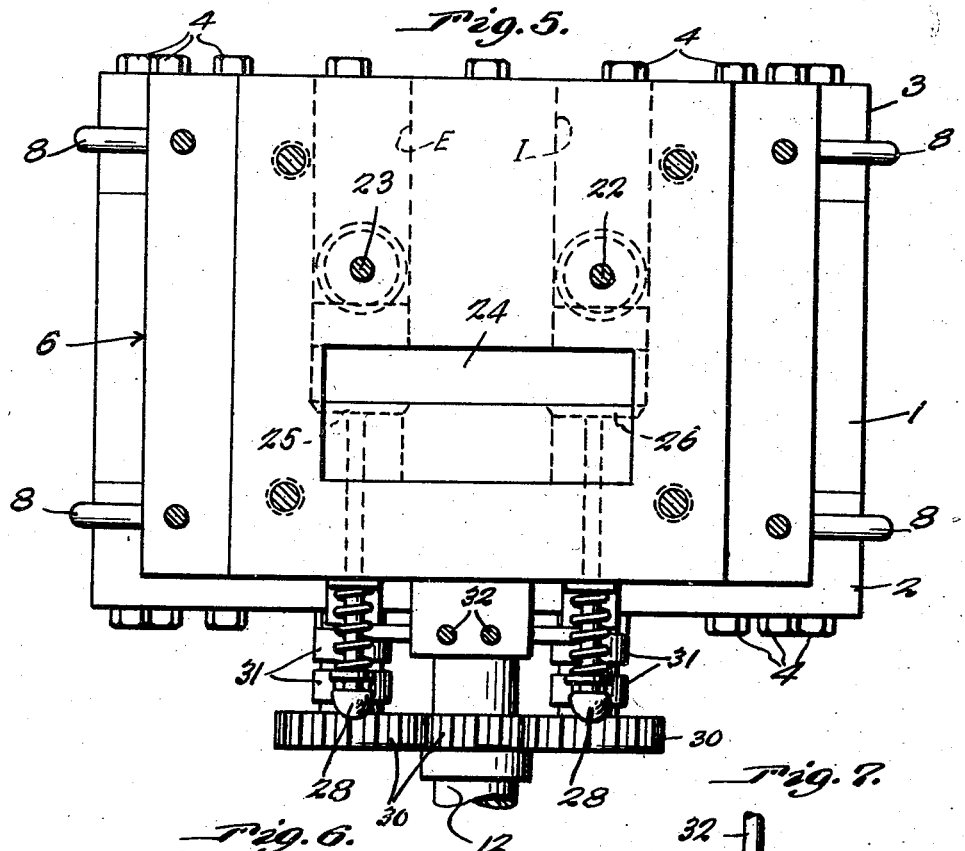
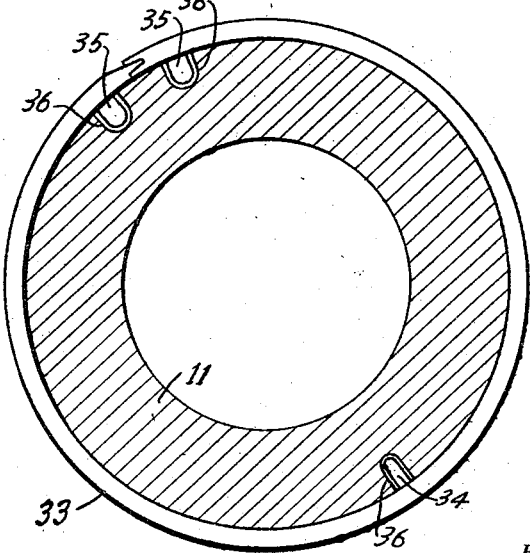
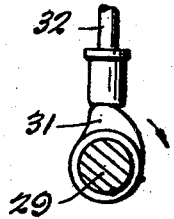
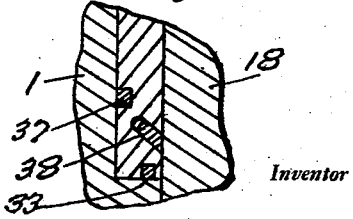
Inventor
Everett W. Rich March 9, 1948.   E. W. RICH   2,437,653
VALVE-IN-HEAD ROTARY INTERNAL COMBUSTION ENGINE EMBODYING
A ROTARY PISTON WITH RADIAL SLIDING VANES AND
HAVING A COMBUSTION CHAMBER IN THE HEAD
Filed July 3, 1943   5 Sheets-Sheet 5
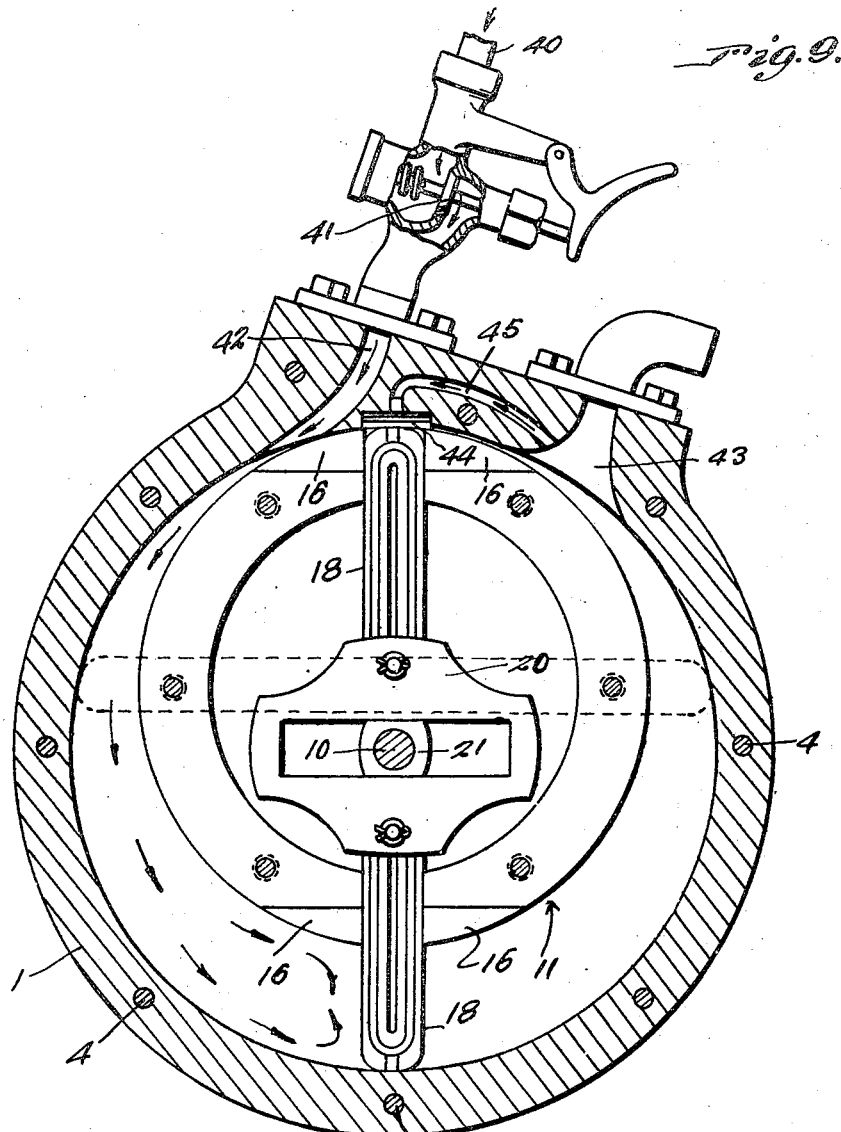
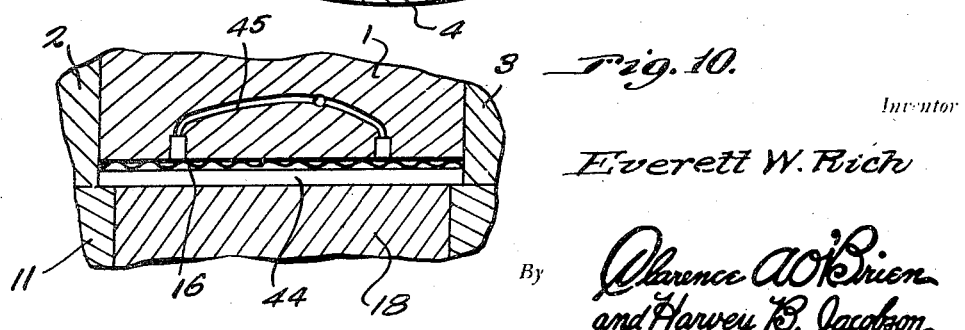
Inventor
Everett W. Rich
By Clarence A. O'Brien
and Harvey B. Jacobson
Attorneys Patented Mar. 9, 1948

2,437,653

UNITED STATES PATENT OFFICE 2,437,653

VALVE-IN-HEAD ROTARY INTERNAL-COMBUSTION ENGINE EMBODYING A ROTARY PISTON WITH RADIAL SLIDING VANES AND HAVING A COMBUSTION CHAMBER IN THE HEAD

Everett W. Rich, San Diego, Calif.

Application July 3, 1943, Serial No. 493,453

1 Claim. (Cl. 123—16)

The present invention relates to new and useful improvements in rotary combustion, steam or air engines or motors and has for one of its important objects to provide a power plant of this character comprising a rotary eccentric piston and vanes of a novel construction and arrangement.

Another very important object of the invention is to provide a rotary engine of the character described comprising unique means for compressing and firing the charge for driving the eccentric piston.

Other objects of the invention are to provide a rotary engine which will be comparatively simple in construction, strong, durable, highly efficient and reliable in operation, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
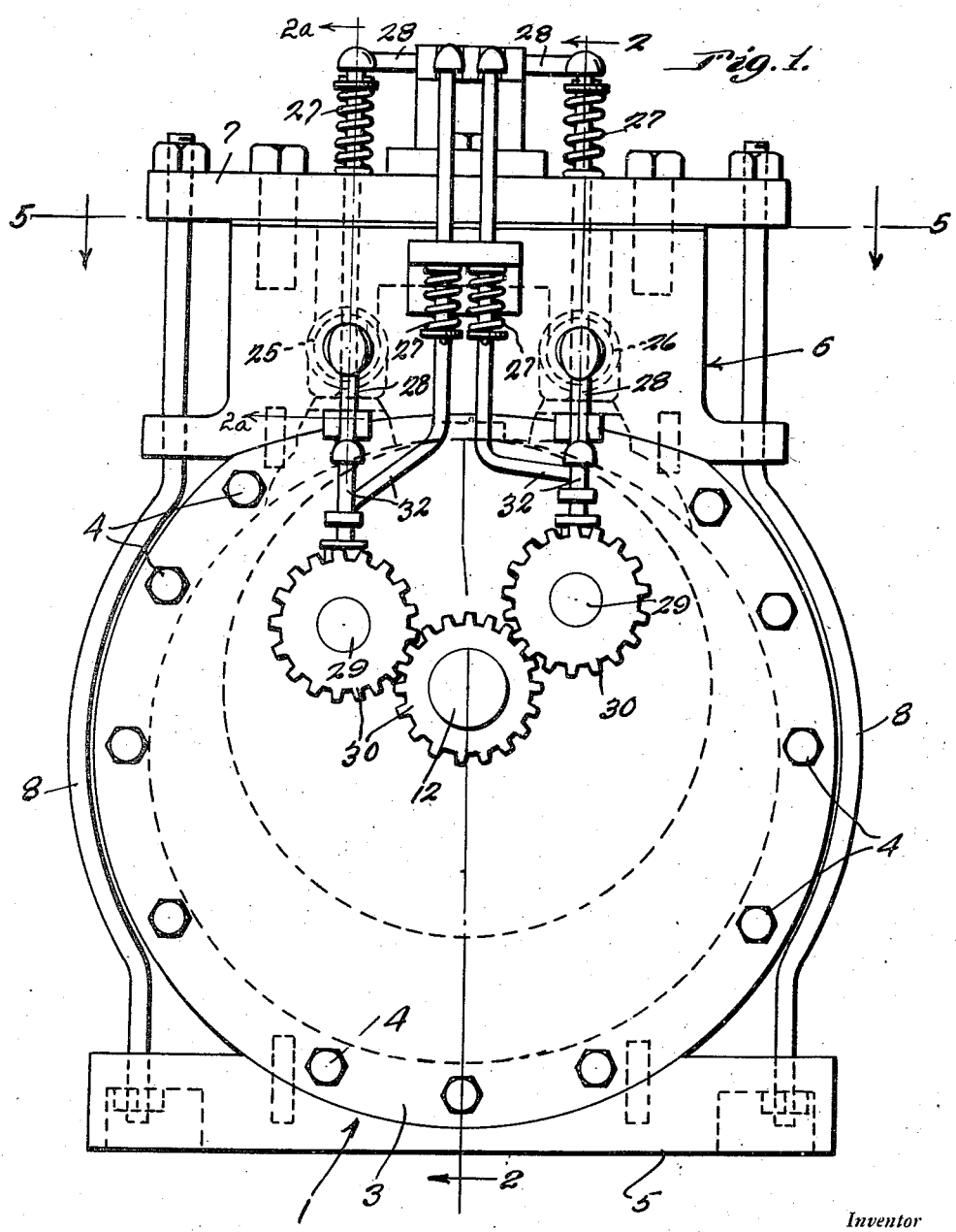
Figure 1 is a view in end elevation of a rotary engine constructed in accordance with the present invention.
Figure 2:
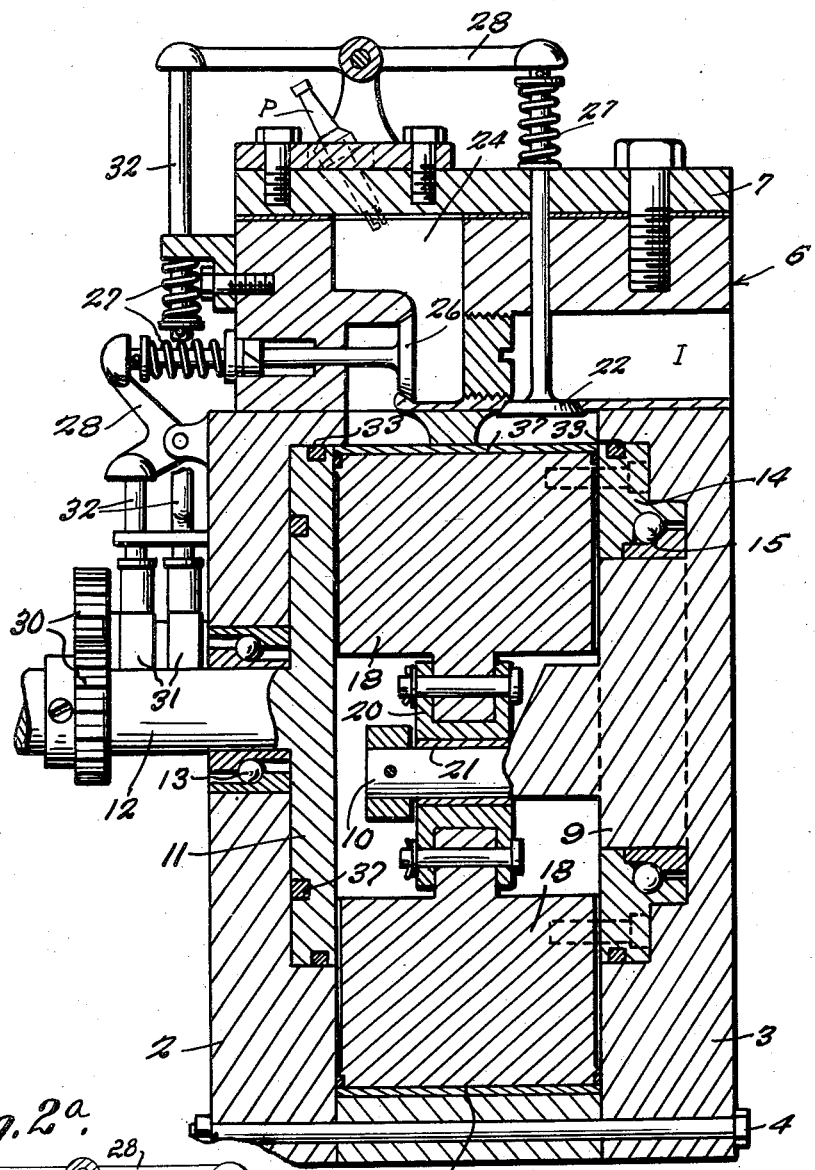
Figure 2 is a vertical sectional view, taken substantially on the line 2—2 of Figure 1.
Figure 2A:
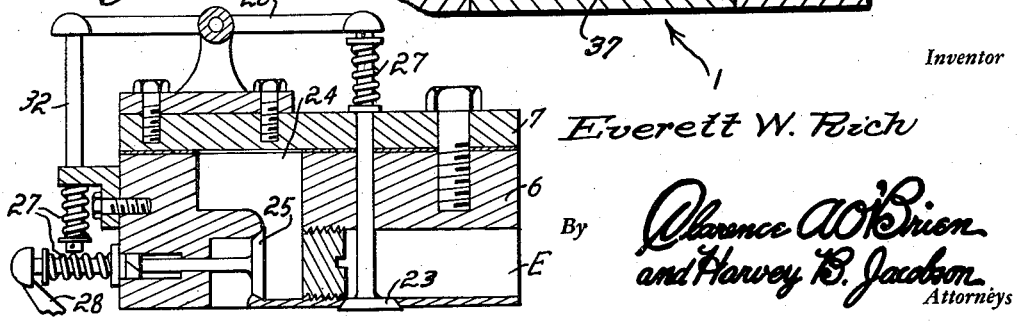

Figure 2—a is a section taken on line 2a—2a of Figure 1.

Figure 3 is a plan view of the rotary eccentrically mounted piston.

Figure 4 is a cross-sectional view through a portion of the housing, showing the rotary piston and vanes therein.

Figure 5 is a view in horizontal section, taken substantially on the line 5—5 of Figure 1.

Figure 6 is a section taken on line 6—6 of Figure 3.

Figure 7 is a cross-sectional view through one of the cam shafts.

Figure 8 is a fragmentary view in section, showing the edge sealing means for the vanes.

Figure 9 is a cross-sectional view, showing the invention embodied in a steam, air or water engine.

Figure 10 is a fragmentary view in vertical section, showing the seal between the housing and the periphery of the rotary piston.

Referring now to the drawing in detail, it will be seen that reference numeral 1 designates a housing having a relieved or non-circular inner peripheral surface, or the side portions of the inner peripheral surface of which are relieved very slightly so that the chamber in the housing is horizontally elongated, as indicated at $a$ in Figure 4. The housing 1 includes removable ends 2 and 3 which are secured in position by bolts 4. A base 5 is provided beneath the housing 1. Mounted on top of the housing 1 is a head 6 comprising a removable top plate 7. Rods 8 secure the housing 1 and the head 6 in assembled position on the base 5, said rods passing through the top plate 7 of said head.

The inner face of the end plate 3 is recessed in a manner to provide an off-center spindle 9 in this end of the housing 1. Projecting from the spindle 9 is a spindle 10 which is centrally located in the housing 1. Mounted eccentrically in the housing 1 is a rotary piston 11. The eccentric piston 11 is fixed on one end of a shaft 12 which is journaled in an off-center bearing 13 which is provided therefor in the end plate 2 of the housing 1. On the end thereof which is remote from the shaft 12, the piston 11 comprises and has bolted thereon a ring 14 which is journaled on a bearing 15 on the spindle 9.

On diametrically opposite sides, the peripheral portion of the piston 11 comprises removable segments 16. Countersunk Allen cap screws 17 secure the segments 16 on the piston 11. Radial vanes 18 are slidably mounted in the piston 11 and operable in the substantially crescent-shaped chamber 19 which said piston defines in the housing 1. The vanes 18 are secured, at their inner ends, to a connector 20 in the piston 11, which connector is rotatable and slidable on the spindle 10. A bearing 21 is provided on the spindle 10 for the connector 20.

The chamber 19 receives fuel from a suitable source through an intake valve 22. The spent gases escape from the chamber 19 through an exhaust valve 23. Formed in the head 6 is a compression and firing chamber 24. The chamber 24 communicates with the chamber 19 through valves 25 and 26. The valves 22, 23, 25, and 26 are of the poppet type and are closed by coil springs 27. Rocker arms 28 on the top plate 7 of the head 6 and on the end plate 2 of the housing 1 open the valves. Cam shafts 29 on the end plate 2 of the housing 1 are driven from the shaft 12 through gears 30. The cams 31 on the shafts 29 actuate the rocker arms 28 through push rods 32.

It is thought that the operation of the engine will be readily apparent from a consideration of the foregoing. Briefly, as the eccentrically mounted piston 11 rotates, the intake valve 22 opens and fuel is drawn through intake passage J into the chamber 19 by that one of the vanes 18 which has just passed the intake valve. The following vane then compresses this fuel in chamber 19 and the valve 25 opens to admit the charge to the chamber 24. A conventional spark plug ignites the charge in the chamber 24 as the vane which has compressed the fuel in said chamber passes the valve 26. As this occurs the valve 26 opens and the exploded charge enters the chamber 19 from the chamber 24 behind this vane for driving same and the piston 11. At the correct time the exhaust valve 23 opens and the spent gases are expelled through exhaust passage E by the following vane. Of course, the various valves are timed to open and close correctly. The same vane receives a power charge and compresses each and every revolution, and the other vane intakes gases on one side and exhausts gases on the other side each revolution, each vane performing its respective work every revolution. The relieved or non-circular shape of the inner peripheral surface of housing 1 permits free operation of the vanes 18 therein even though the latter are disposed exactly diametrically of the housing only when said vanes are vertical.

Split rings 33 are mounted in circumferential grooves which are provided therefor in the periphery of the piston 11, adjacent the ends thereof, for preventing leakage between said piston and the annular wall of the chamber 19. Pins 34 and 35 are mounted, respectively, in intermediate portions of the rings 33 and on the end portions thereof. The pins 34 and 35 are engaged in sockets 36 which are provided therefor in the piston 11. The pins 35 are comparatively heavy for causing the rings 33 to expand by centrifugal force and contact the annular wall of the chamber 19. Suitable rings and seals 37 and 38, respectively, are provided for preventing leakage between other relatively moving parts of the pistons 11, the vanes 18, etc. A conventional spark plug P ignites the charge in the chamber 24. Any suitable ignition system may be provided for the engine. As best seen in Figure 3 of the drawing, the faces of the vanes 18 are concave so that the gases are crowded toward the radial centers thereof.

In the embodiment illustrated in Figures 9 and 10 of the drawing, a steam line 40, from a suitable source of supply, is connected through a throttle valve 41 to an intake port or passage 42 which communicates with the chamber 19 in the housing 1. An exhaust port 43 is provided in the housing 1 in back of the intake 42. A sealing bar 44 which is recessed into the housing 1 between the intake 42 and the exhaust 43 rides on the periphery of the rotary piston 11. Steam ducts 45, from the exhaust port 43 introduce steam behind or above the bar 44 for contacting same with the rotary piston. A spring 46 is also provided for this purpose.

In operation, steam entering the chamber 19 impinges the vanes 18 as they pass the intake port 42 for driving the rotary piston 11. As the vanes 18 pass the exhaust port or passage 43 the spent steam is exhausted from the chamber 19.

It is believed that the many advantages of a rotary engine constructed in accordance with the present invention will be readily understood and although preferred embodiments are as illustrated and described, it is to be understood that further modifications and changes in the details of construction and in the combination and arrangement of parts may be resorted to which will fall within the scope of the invention as claimed.

What is claimed is:

In a rotary engine, a housing, a rotary piston eccentrically mounted in the housing and having radial sliding vanes, a head removably mounted on the housing and provided with a combustion chamber and having horizontal intake and exhaust passages opening through one side thereof, said intake and exhaust passages communicating with the housing at circumferentially spaced points, said head further having admission and outlet passages respectively connecting opposite ends of the combustion chamber with the interior of the housing at circumferentially spaced points, valve mechanism including poppet valves carried by the head and movable substantially radially of the housing for controlling said intake and exhaust passages, other valve mechanism including poppet valves movable parallel with the axis of the piston for controlling said admission and outlet passages, a charge-igniting device for the combustion chamber, and an axial shaft for the piston, said valve mechanism including cam shafts at opposite sides of and driven by said axial shaft, and means operatively connecting said cam shafts to said poppet valves.

EVERETT W. RICH.

REFERENCES CITED

The following references are of record in the file of this patent:

UNITED STATES PATENTS

| Number | Name | Date |
| --- | --- | --- |
| 222,439 | Barrow | Dec. 9, 1879 |
| 231,520 | Barrow | Aug. 24, 1880 |
| 659,530 | Jackson | Oct. 9, 1900 |
| 973,833 | Wilber | Oct. 25, 1910 |
| 1,193,251 | Foxgord et al. | Aug. 1, 1916 |
| 1,302,504 | Briggs | May 6, 1919 |
| 1,322,882 | Dorval | Nov. 25, 1919 |
| 1,835,173 | Musselwhite | Dec. 8, 1931 |
| 1,857,931 | Axien | May 10, 1932 |
| 2,170,414 | Jutting | Aug. 22, 1939 |
| 2,231,440 | Fess | Feb. 11, 1941 |

FOREIGN PATENTS

| Number | Country | Date |
| --- | --- | --- |
| 2,419 | Great Britain | June 22, 1877 |
| 407,135 | Great Britain | Mar. 15, 1934 |
| 249,539 | Italy | July 28, 1926 |